(12) United States Patent
Kim

(10) Patent No.: US 8,359,648 B2
(45) Date of Patent: Jan. 22, 2013

(54) METHOD AND SYSTEM FOR DEFENDING DDOS ATTACK

(75) Inventor: Jang Joong Kim, Seoul (KR)

(73) Assignee: ESTsoft Corp. (KR)

(*) Notice: Subject to any disclaimer, the term of this patent is extended or adjusted under 35 U.S.C. 154(b) by 574 days.

(21) Appl. No.: 12/551,784

(22) Filed: Sep. 1, 2009

(65) Prior Publication Data

US 2010/0058471 A1     Mar. 4, 2010

(30) Foreign Application Priority Data

Sep. 4, 2008   (KR) ........................ 10-2008-0087234

(51) Int. Cl.
*G06F 11/00*     (2006.01)

(52) U.S. Cl. ........................................................ 726/22

(58) Field of Classification Search ...................... 726/22
See application file for complete search history.

(56) References Cited

U.S. PATENT DOCUMENTS

| | | | |
|---|---|---|---|
| 7,099,320 B1* | 8/2006 | Salerno .......................... | 370/389 |
| 7,409,712 B1* | 8/2008 | Brooks et al. ................... | 726/22 |
| 7,478,429 B2* | 1/2009 | Lyon .............................. | 726/23 |
| 7,620,986 B1* | 11/2009 | Jagannathan et al. .......... | 726/22 |
| 7,882,556 B2* | 2/2011 | Ahn et al. ........................ | 726/13 |
| 2005/0198519 A1* | 9/2005 | Tamura et al. .................. | 713/188 |
| 2007/0153689 A1* | 7/2007 | Strub et al. ..................... | 370/230 |
| 2009/0013404 A1* | 1/2009 | Chow et al. ..................... | 726/22 |
| 2009/0144806 A1* | 6/2009 | Gal et al. .......................... | 726/3 |
| 2010/0122342 A1* | 5/2010 | El-Moussa et al. ............. | 726/22 |

FOREIGN PATENT DOCUMENTS

| KR | 10-2005-0096743 | 10/2005 |
|---|---|---|
| KR | 10-0766724 | 10/2007 |

* cited by examiner

*Primary Examiner* — Kambiz Zand
*Assistant Examiner* — Aubrey Wyszynski
(74) *Attorney, Agent, or Firm* — Harness, Dickey & Pierce, P.L.C.

(57) ABSTRACT

In a method of defending a Distributed Denial of Service (DDoS) attack, an attack target server determines whether the attack target server suffers a DDoS attack from a plurality of terminals and, according to a result of the determination, informs a control server that the attack target server suffers the DDoS attack by transmitting its own information to the control server. The control server which has received the information of the attack target server confirms the plurality of terminals which transmits data to the attack target server and transmits an attack prevention message to the plurality of confirmed terminals. Each of the plurality of terminals which has received the attack prevention message determines whether the terminal launches the DDoS attack and, according to a result of the determination, blocking the DDoS attack.

4 Claims, 4 Drawing Sheets

METHOD AND SYSTEM FOR DEFENDING DDOS ATTACK

CROSS-REFERENCE TO RELATED APPLICATION

This application claims the benefit of Korean Patent Application No. 10-2008-0087234 filed on Sep. 4, 2008, which is hereby incorporated by reference.

BACKGROUND OF THE INVENTION

1. Field of the Invention

The present invention relates to a method and system for defending a Distributed Denial of Service (DDoS) attack.

2. Background of the Related Art

A DDoS attack refers to that several computers operate at the same time and attack a specific website.

In more detail, a DDoS attack is a scheme for distributing a program for Denial of Service (DoS) attack which can flood numerous hosts, interconnected over a network, with packets into the hosts and enabling the hosts to cause a slow network performance and system paralysis for an attack target system in an integrated way. The DoS attack refers to all actions which make impossible the hardware or software of an attack target system, thus causing problems in a system performing a normal operation. Attack methods which enable a wide variety of attacks and can obtain instant and noticeable results may include, for example, smurf, trinoo, and SYN flooding. If a hacker installs tools for service attacks in several computers in order to attack a specific website and simultaneously floods a computer system of the target website with a tremendous amount of packets which cannot be processed by the computer system, the performance of a network is slowed or the computer system becomes impossible.

The possibility of attacks over a network is gradually increasing because of an increase in distributed systems and the proliferation of the Internet. In order to protect systems from a threat of potential attacks, a conventional system defends a DDoS attack through backbone-based network control.

However, conventional security devices are problematic in that they cannot detect attacks within an attack agent terminal and cannot deal with a corresponding source properly and efficiently, even if such attacks are detected.

SUMMARY OF THE INVENTION

Accordingly, the present invention has been made in view of the above problems occurring in the prior art, and it is an object of the present invention to provide a method of defending a DDoS attack, which is capable of efficiently defending a DDoS attack.

It is another object of the present invention to provide a system for defending a DDoS attack, which is capable of efficiently defending a DDoS attack.

The technical objects to be accomplished by the present invention are not limited to the above-mentioned objects and other technical objects that have not been mentioned above will become more evident to those skilled in the art from the following description.

To accomplish the above objects, a method of defending a DDoS attack according to an aspect of the present invention comprises the steps of an attack target server determining whether it suffers the DDoS attack from a plurality of terminals and, according to a result of the determination, informing a control server that it suffers the DDoS attack, the control server transmitting an attack prevention message to the plurality of terminals, and each of the plurality of terminals which has received the attack prevention message determining whether it launches the DDoS attack, and blocking the DDoS attack according to a result of the determination.

To accomplish the above objects, a method of defending a DDoS attack according to another aspect of the present invention comprises the steps of an attack target server informing a control server that it suffers the DDoS attack from a plurality of terminals, the control server transmitting an attack prevention message to the plurality of terminals, and each of the plurality of terminals which has received the attack prevention message blocking the DDoS attack.

Here, the step of the attack target server determining whether it suffers the DDoS attack from the plurality of terminals may comprise the steps of setting the amount of data that can be processed, determining whether the amount of data that needs to be processed exceeds the set amount of data, and if, as a result of the determination, the amount of data that needs to be processed is determined to exceed the set amount of data, considering the data that needs to be processed as the DDoS attack.

Furthermore, the step of the attack target server informing the control server that it suffers the DDoS attack may comprise the step of informing the control server that it suffers the DDoS attack by transmitting its own information to the control server. The step of the control server transmitting the attack prevention message to the plurality of terminals may comprise the step of confirming the plurality of terminals that transmits data to the attack target server and transmitting the attack prevention message to the plurality of confirmed terminals.

Furthermore, the information of the attack target server may include TCP/IP or UDP/IP.

The method may further comprise the step of registering the information of the attack target server with the control server. In this case, the step of the attack target server informing the control server that it suffers the DDoS attack may comprise the step of, if the attack target server determines that it suffers the DDoS attack, informing the control server that it suffers the DDoS attack by sending an agreed command to the control server. The step of the control server transmitting the attack prevention message to the plurality of terminals may comprise the step of the control server that has received the agreed command confirming the plurality of terminals that transmits data to the attack target server and transmitting the attack prevention message to the plurality of confirmed terminals.

Furthermore, the step of each of the plurality of terminals determining whether it launches the DDoS attack may comprise the steps of, when the attack prevention message is received from the control server, determining whether it transmits data to the attack target server and, if, as a result of the determination, the terminal is determined not to transmit the data to the attack target server, considering the data as the DDoS attack.

To accomplish the above objects, a system for defending a DDoS attack according to yet another aspect of the present invention comprises a plurality of terminals, an attack target server, and a control server coupled to the plurality of terminals and the attack target server. Here, the attack target server determines whether it suffers a DDoS attack from the plurality of terminals and informs the control server that it suffers the DDoS attack according to a result of the determination. If the control server is informed that the attack target server suffers the DDoS attack, the control server transmits an attack prevention message to the plurality of terminals. Each of the plurality of terminals that has received the attack prevention message determines whether it launches the DDoS attack and blocks the DDoS attack according to a result of the determination.

To accomplish the above objects, a system for defending a DDoS attack according to further yet another aspect of the present invention comprises a plurality of terminals, an attack target server, and a control server coupled to the plurality of terminals and the attack target server. Here, each of the terminals comprises a connection module configured to access the control server and to transmit its own information to the control server at predetermined intervals, a monitoring module configured to manage access information of the terminal to the control server and to determine whether a request to prevent a DDoS attack has been received, and a blocking module configured to determine whether the terminal launches the DDoS attack against the attack target server when an attack prevention message is received from the control server and to block the DDoS attack according to a result of the determination.

To accomplish the above objects, a system for defending a DDoS attack according to further yet another aspect of the present invention comprises a plurality of terminals, an attack target server, and a control server coupled to the plurality of terminals and the attack target server. Here, the control server comprises an information storage module configured to store information about the plurality of terminals, a reception module configured to receive a request to defend a DDoS attack from the attack target server, and a defense request module configured to request a plurality of terminals that transmits data to the attack target server to prevent the DDoS attack.

Here, what the blocking module determines whether the terminal launches the DDoS attack against the attack target server may comprise, when the attack prevention message is received from the control server, determining whether the terminal transmits data to the attack target server and, if, as a result of the determination, the terminal is determined not to transmit the data to the attack target server, considering the data as the DDoS attack.

Furthermore, the information of the terminal may comprise TCP/IP or UDP/IP.

The details of other embodiments are included in the detailed description and the drawings.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
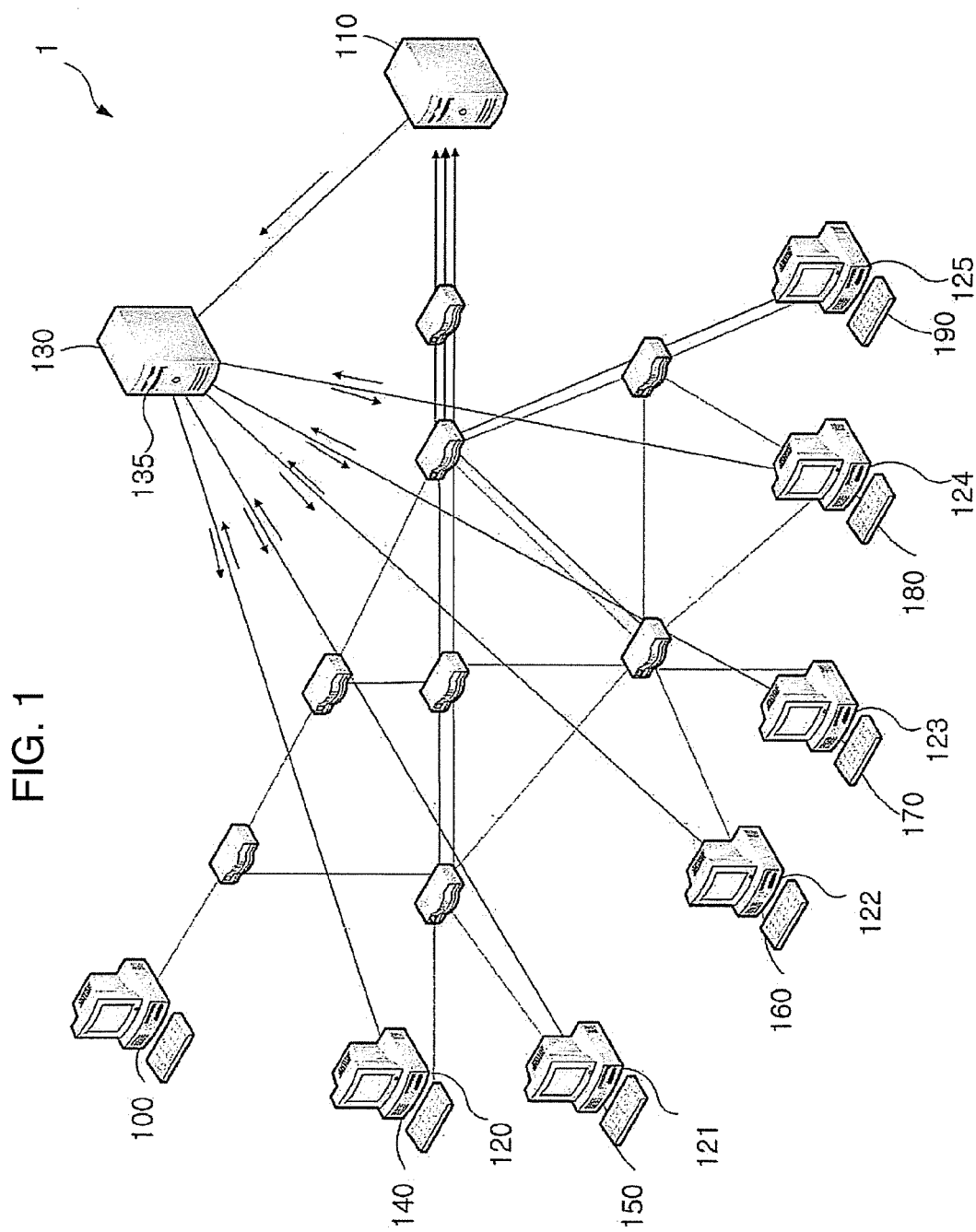
FIG. 1 is an explanatory view showing a system for defending a DDoS attack according to an embodiment of the present invention.

The present invention will now be described in detail in connection with preferred embodiments with reference to the accompanying drawings.

Merits and characteristics of the present invention, and methods for accomplishing them will become more apparent from the following embodiments taken in conjunction with the accompanying drawings. However, the present invention is not limited to the disclosed embodiments, but may be implemented in various manners. The embodiments are provided to complete the disclosure of the present invention and to allow those having ordinary skill in the art to understand the scope of the present invention. The present invention is defined by the category of the claims. The same reference numbers will be used throughout the drawings to refer to the same or like parts.

It will be understood that, although the terms 'first,' 'second,' etc. may be used herein to describe various devices, elements or sections, the devices, elements or sections should not be limited by these terms. These terms are only used to distinguish one element from another. For example, a first device, a first element or a first section described herein could be termed a second device, a second element or a second section without departing from the scope of the present invention.

The terminologies used herein are for the purpose of describing particular embodiments only and are not intended to be limiting of the present invention. As used herein, the singular forms are intended to include the plural forms as well, unless the context clearly indicates otherwise. It will be further understood that the terms "comprises" or "comprising", when used herein, specify the presence of stated elements, steps, operations or devices, but do not preclude the presence or addition of one or more other elements, steps, operations or devices. Further, "A or B" refers to A, B, A, and B. In addition, the same reference numbers will be used throughout the drawings to refer to the same or like parts.

Unless defined otherwise, all terms (including technical and scientific terms) used herein may be used as meanings which can be in common understood by those having ordinary skill in the art. Further, terms defined in general dictionaries should not be interpreted ideally or excessively, unless defined otherwise.

Further, it should be understood that combinations of processing blocks and flowcharts shown in the drawings may be performed by computer program instructions. The computer program instructions may be mounted on general-purpose computers, specially-designed computers or a processor of other programmable data processing equipment. The instructions that are executed by the computers or the processor of other programmable data processing equipment generate means for executing the functions described in the block(s) of the flowchart. The computer program instructions may also be stored in computer-available or computer-readable memory which can be intended for a computer or other programmable data processing equipment in order to implement the functions in a specific way. The instructions stored in the computer-available or computer-readable memory may also be used to produce production articles which include instruction means for performing the functions described in the block(s) of the flowchart. The computer program instructions may also be mounted on a computer or other programmable data processing equipment. Thus, the instructions which operate the computer or the other programmable data processing equipment by generating a process executed by a computer through a series of operation steps that are performed on the computer or other programmable data processing equipment may also provide steps for executing the functions described in the block(s) of the flowchart.

FIG. 1 is an explanatory view showing a system for defending a DDoS attack according to an embodiment of the present invention.

Referring to FIG. 1, the system for defending a DDoS attack 1 according to an embodiment of the present invention includes an attacker master 100, an attack target server 110, a control server 130, and a plurality of terminals 140 to 190.

The attacker master 100 determines the attack target server 110 (i.e., a target for an attack) and uses one or more terminals 140 to 190 in order to attack the determined attack target server 110.

The one or more terminals 140 to 190 may launch a DDoS attack by sending a large amount of data to the attack target server 110 under the control of the attacker master 100. That is, the one or more terminals 140 to 190 transmit, to the attack target server 110, a large amount of data that cannot be processed by the attack target server 110. Here, the data may be transmitted in the form of, for example, a packet.

The attack target server 110 is a subject to be attacked by the one or more terminals 140 to 190.

In an embodiment of the present invention, the attack target server 110 can determine whether it suffers a DDoS attack and can inform the control server 130 that it suffers the DDoS attack according to the determination result.

In more detail, the amount of data that can be processed is previously set in the attack target server 110. The attack target server 110 can determine whether the amount of data that needs to be processed now exceeds a predetermined amount of data in real time. If, as a result of the determination, the amount of data that needs to be processed now is determined to exceed the predetermined amount of data, the attack target server 110 may determine that it suffers a DDoS attack. The attack target server 110 informs the control server 130 that it suffers a DDoS attack and requests the control server 130 to prevent a DDoS attack.

A method of the attack target server 110 requesting a DDoS attack may be automatically performed by the attack target server 110 when the attack target server 110 determines that it suffers a DDoS attack or may be manually performed by an administrator of the attack target server 110.

The control server 130 receives information about the plurality of terminals 140 to 190, including TCP/IP or UDP/IP of the plurality of terminals 140 to 190, and access information of the terminals, including an access port and an access protocol, and stores the pieces of information. The control server 130 controls or manages the plurality of terminals 140 to 190 or communicates with the plurality of terminals 140 to 190 based on the above information.

Further, the control server 130 determines whether the attack target server 110 has requested to prevent a DDoS attack. If, as a result of the determination, the attack target server 110 is determined to have requested to prevent a DDoS attack, the control server 130 transmits an attack prevention message to the one or more terminals 140 to 190 which are transmitting data to the attack target server 110. In other words, the control server 130 requests the one or more terminals 140 to 190 to prevent a DDoS attack.

In particular, network controllers 120 to 125 may be installed within the plurality of respective terminals 140 to 190. The network controllers 120 to 125 may be implemented in a software way or in a hardware way. Each of the network controllers 120 to 125, as described below with reference to FIG. 3, may include a connection module 310, a monitoring module 320, and a blocking module 330.

Here, the control server 130 confirms the plurality of terminals 140 to 190 that transmits data to the attack target server 110 when the terminals 140 to 190 receive the attack prevention message and transmits the attack prevention message to the plurality of terminals 140 to 190 according to a result of the confirmation.

Each of users of the terminals 140 to 190 that have received the attack prevention message determines whether the terminal transmits data to the attack target server 110. If, as a result of the determination, the terminal is determined to transmit the data to the attack target server 110 even though there is no command to transmit the data from the user, the user determines the data as a DDoS attack. A method of determining whether data is transmitted may be manually performed by a user or may be automatically determined by the terminals 140 to 190. The method of a user manually determining whether data is transmitted may be performed by sending the contents, informing that he has no intention to transmit the data, or a reply informing that he will stop the DDos attack.

The one or more terminals 140 to 190 that have determined such transmission a DDoS attack block the DDoS attack. A method of blocking a DDoS attack may be performed by the network controllers 120 to 125 blocking the transmission of data to the attack target server 110.

Hereinafter, a method of preventing a DDoS attack is described in detail with reference to FIGS. 1 and 2. It is evident that, although only the terminal 140 of the plurality of terminals 140 to 190 is described as an example with reference to FIG. 2, for convenience of description, the above method is true of the remaining terminals 150 to 190.

Figure 2:
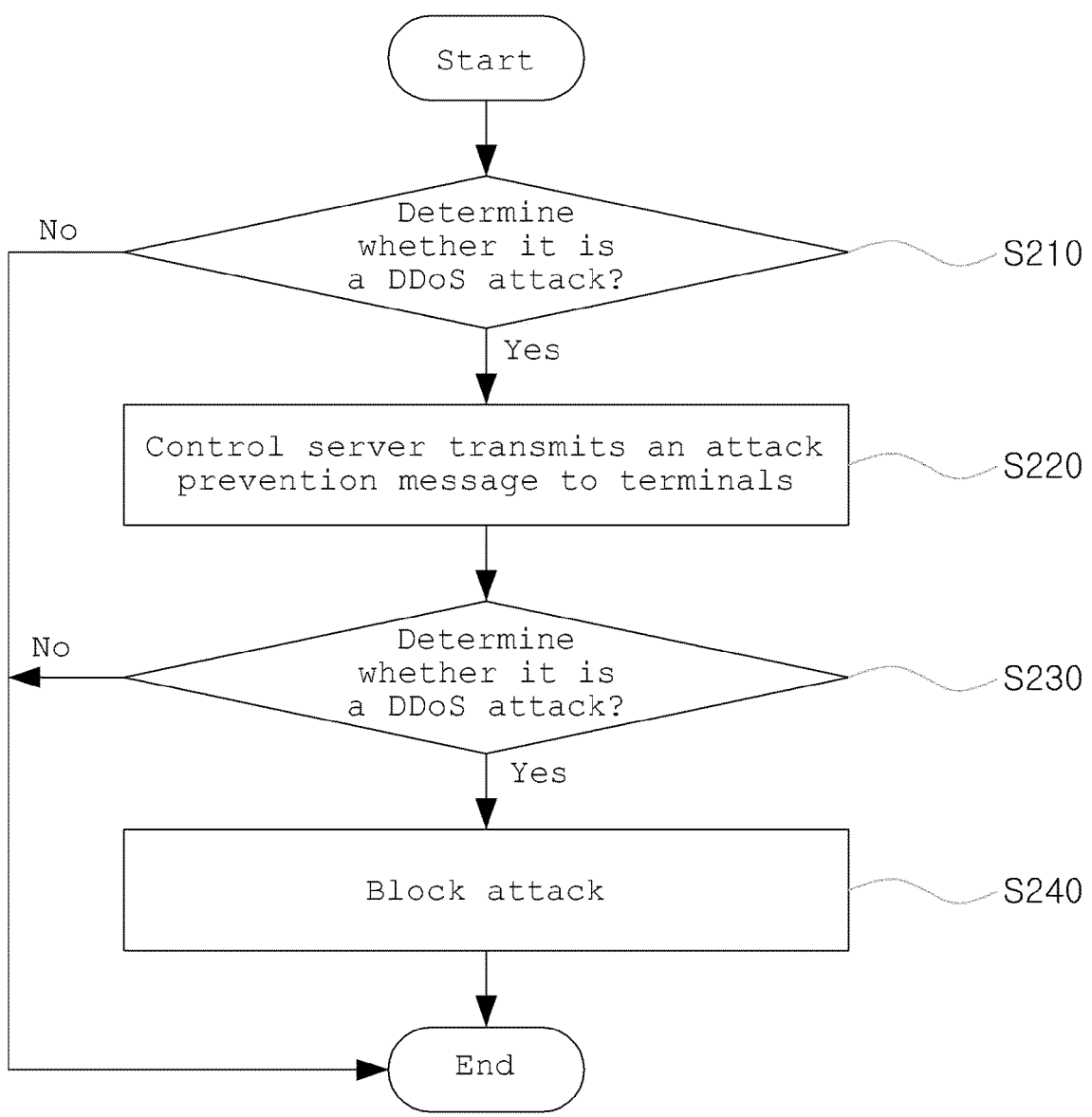
FIG. 2 is a flowchart illustrating the system for defending a DDoS attack according to an embodiment of the present invention.

FIG. 2 is a flowchart illustrating the method of preventing a DDoS attack described with reference to FIG. 1. Here, information about the attack target server 110 and the terminal 140 may comprise information about TCP/IP or UDP/IP.

Referring to FIGS. 1 and 2, the attack target server 110 determines whether it suffers a DDoS attack at step S210.

In more detail, a method of the attack target server 110 determining whether it suffers a DDoS attack is performed by setting the amount of data that can be processed now and determining whether the amount of data that needs to be processed now exceeds the set amount of data in real time.

The amount of data may be based on, for example, the amount of packets. For example, the amount of data that can be processed may be 1518 bytes.

If, as a result of the determination, the amount of data that needs to be processed now is determined to exceed the set amount of data, the attack target server 110 considers it as a DDoS attack and requests the control server 130 to prevent a DDoS attack manually or automatically.

In more detail, in a method of the attack target server 110 requesting to prevent a DDoS attack automatically, when the amount of data that needs to be processed now exceeds the set amount of data, the attack target server 110 automatically transmits information about the attack target server 110, including its own TCP/IP, UDP/IP, port, or protocol, to the control server 130.

Further, in a method of the attack target server 110 requesting to prevent a DDoS attack manually, when the amount of data that needs to be processed now exceeds the set amount of data, an administrator of the attack target server 110 confirms the attack target server 110 and manually transmits information about the attack target server 110, including a port and a protocol of the attack target server 110, to the control server 130 through the attack target server 110.

Meanwhile, the information of the attack target server 110 may be stored in the control server 130 in advance. In this case, if the reception of data is considered as a DDoS attack, the attack target server 110 requests the control server 130 to prevent a DDoS attack by sending an agreed command to the control server 130 when the amount of data that needs to be processed by the attack target server 110 exceeds the set amount of data.

If, as a result of the determination at step S210, the attack target server 110 is determined to suffer a DDoS attack, the control server 130 transmits an attack prevention message to the at least one terminal 140 at step S220.

If a request to prevent a DDoS attack is received from the attack target server 110, the control server 130 transmits the attack prevention message to the at least one terminal 140 which are transmitting data to the attack target server 110. In more detail, the attack prevention message is information about the attack target server 110, and it may include information about a port and a protocol.

The terminal 140 that has received the attack prevention message determines whether a DDoS attack is performed based on the received attack prevention message at step S230.

A user of the terminal 140 determines whether the terminal transmits data to the attack target server 110 according to his intention. If the terminal 140 transmits the data to the attack target server 110 even though the user of the terminal 140 that has received the attack prevention message has not issued a command to transmit the data to the attack target server 110, the terminal determines the data as a DDoS attack.

The terminal 140 having the network controller 120 installed therein blocks such DDoS attack data transmission using the network controller 120 at step S240.

If such data transmission is determined to be a DDoS attack, the terminal 140 that has received the attack prevention message requests to block such data transmission through the network controller 120. The network controller 120 that has received the request to block data transmission blocks the corresponding terminal 140 from transmitting data to the attack target server 110.

Exemplary constructions of the terminal and the control server are described below with reference to FIGS. 3 and 4. Although the terminal 140 of the plurality of terminals 140 to 190 is described as an example, for convenience of description, it is evident that such a description is true of the remaining terminals 150 to 190.

Figure 3:
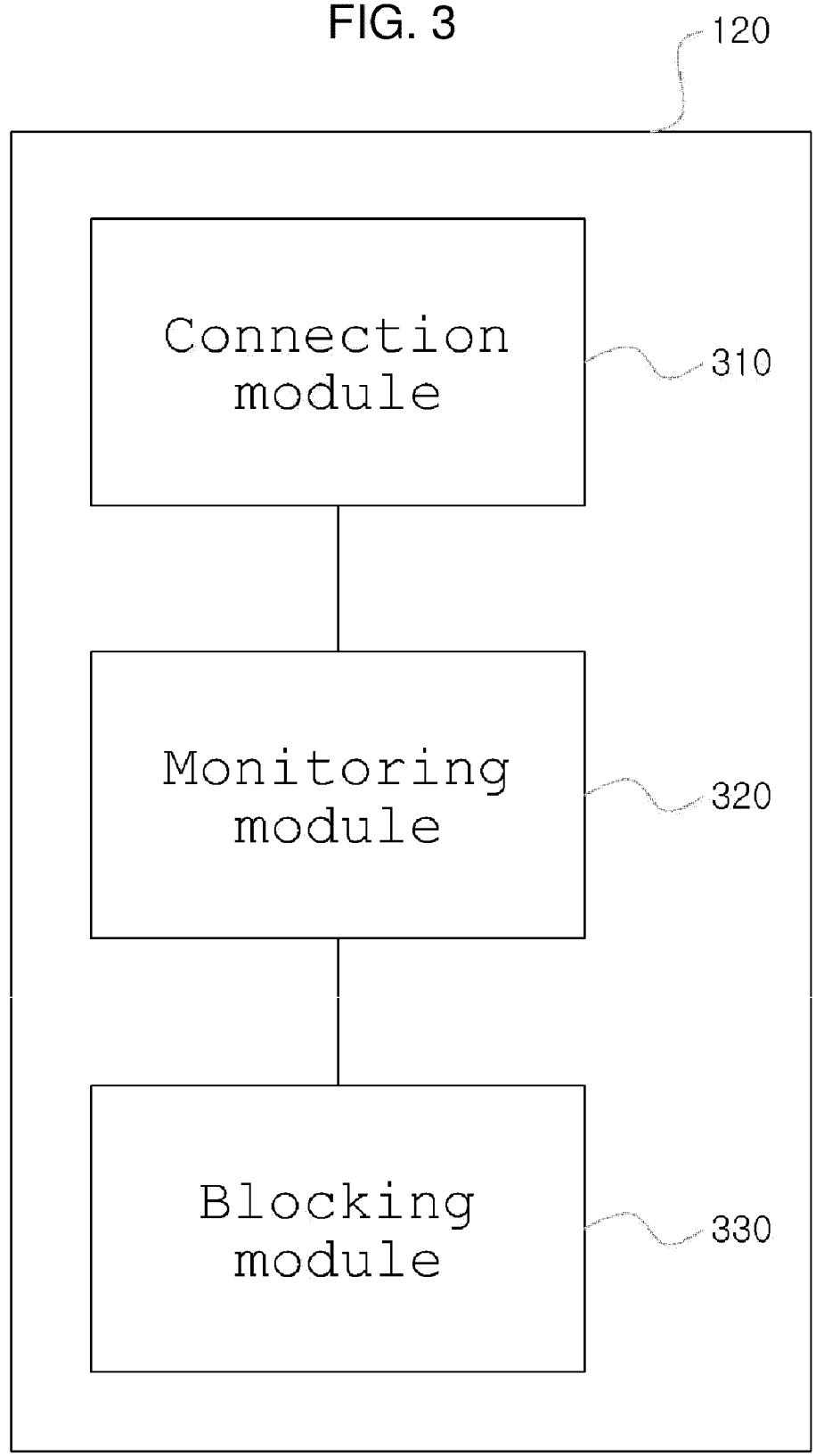
FIG. 3 is an internal block diagram of a terminal having a network controller installed therein according to an embodiment of the present invention.

FIG. 3 is an internal block diagram of the terminal 140 having the network controller 120 installed therein shown in FIG. 1.

Referring to FIG. 3, the network controller 120 includes the connection module 310, the monitoring module 320, and the blocking module 330.

The connection module 310 of the network controller 120 transmits information of the terminal 140 to the control server 130 at predetermined intervals. Here, the network controller 120 may set the predetermined intervals to, for example, 3 months or 6 months.

In more detail, the information of the terminal 140 may include, as described above, information about the terminal 140, such as TCP/IP or UDP/IP of the terminal 140, and access information of the terminal 140, such as an access port or an access protocol. The connection module 310 of the control server 130 stores the information about the terminal 140 and the access information of the terminal 140 and manages the terminal 140 coupled to the control server 130.

The monitoring module 320 manages the access information about the terminal 140 and determines whether a request to prevent a DDoS attack has been received.

The access information of the terminal 140 includes an access port and an access protocol.

The blocking module 330 excludes the terminal 140 from transmitting data to the attack target server 110. If the terminal 140 that transmits data to the attack target server 110 receives an attack prevention message from the control server 130, a user of the terminal 140 determines whether the terminal 140 transmits the data to the attack target server 110 according to his intention. If, even though the user of the terminal 140 has not intended to transmit the data, the terminal 140 is determined to transmit the data to the attack target server 110, the blocking module 330 determines the data as a DDoS attack and blocks such data transmission using the network controller 120.

Figure 4:
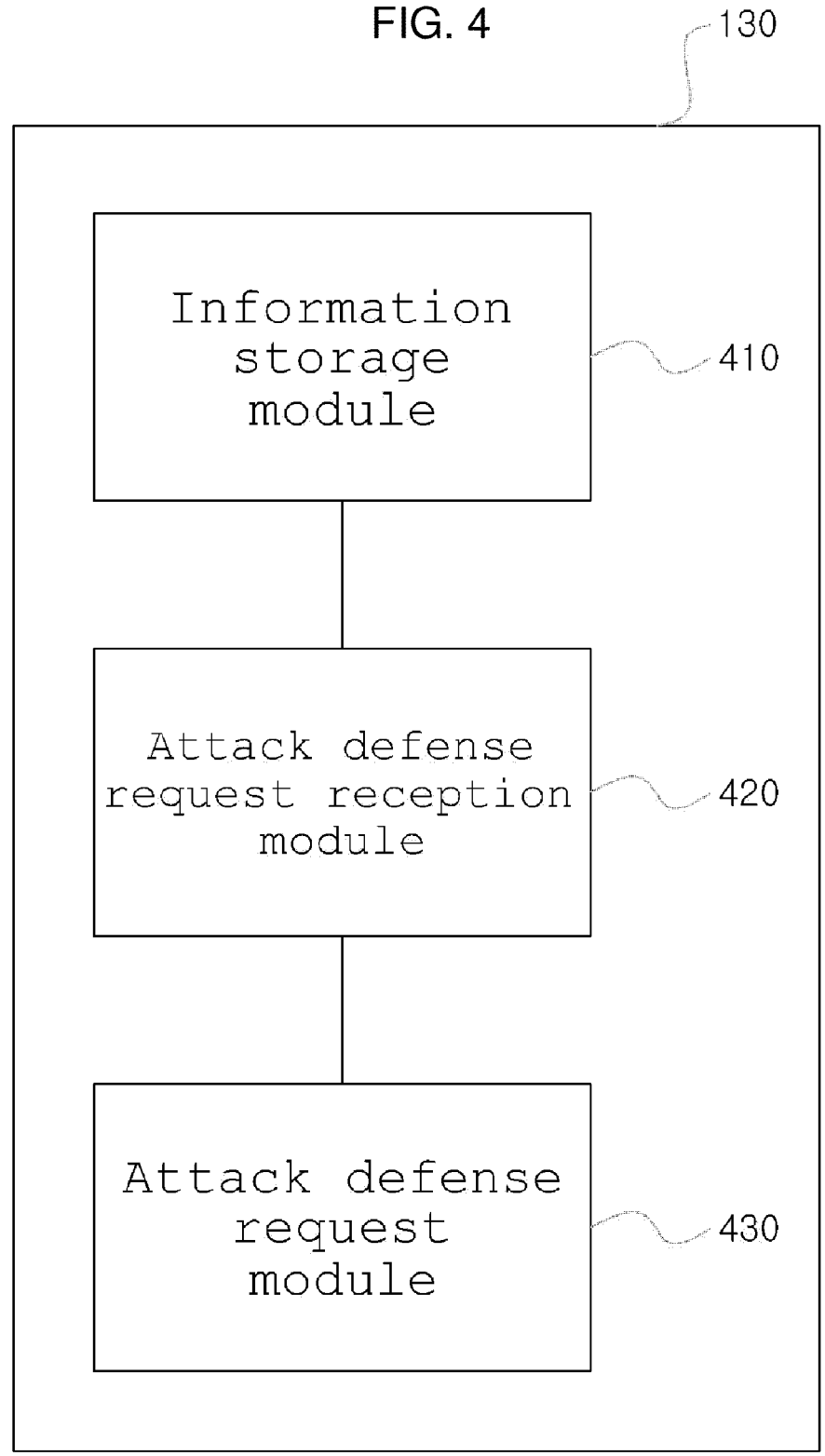
FIG. 4 is a block diagram of a control server according to an embodiment of the present invention.

FIG. 4 is a block diagram of the control server 130 shown in FIG. 1.

Referring to FIG. 4, the internal module 135 of the control server 130 includes an information storage module 410 for storing the TCP/IP or UDP/IP of the terminal 140, a DDoS attack defense request reception module 420, and a DDoS attack defense request module 430.

The information storage module 410 of the control server 130 stores the TCP/IP or UDP/IP information of the terminal 140.

The DDoS attack defense request reception module 420 receives a DDoS attack prevention request from the attack target server 110. The received request information includes information of the attack target server 110, including a port and a protocol of the attack target server 110.

If a DDoS attack prevention request is received from the attack target server 110, the DDoS attack defense request module 430 requests the terminal 140 which transmits data to the attack target server 110 and has the network controller 120 installed therein to prevent a DDoS attack.

Meanwhile, the above embodiments of the present invention may be written in the form of a program that can be executed by a computer and may be implemented in a general-purpose digital computer which executes the program using a computer-readable recording medium.

The computer-readable recording medium may include recording media, such as magnetic recording media (e.g., ROM, a floppy disk, and a hard disk), optical reading media (e.g., CD-ROM and DVD), and carrier waves (e.g., transmission over the Internet).

Although the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of defending against a Distributed Denial of Service (DDoS) attack, the method comprising:
   at an attack target server,
      determining whether the attack target server suffers a DDoS attack from a plurality of terminals, and
      according to a result of the determination by the attack target server, informing a control server that the attack target server suffers the DDoS attack by transmitting information of the attack target server to the control server;
   at the control server,
      confirming which of the plurality of terminals are transmitting data to the attack target server, and
      transmitting an attack prevention message to the plurality of confirmed terminals; and
   at each recipient terminal of the plurality of terminals that received the attack prevention message, determining whether the recipient terminal is participating in the DDoS attack and blocking the DDoS attack from the recipient terminal according to a result of the determination by the recipient terminal, wherein the determination by the recipient terminal comprises:

in response to receiving the attack prevention message from the control server, determining whether the recipient terminal is transmitting data to the attack target server according to a command of a user of the recipient terminal, and in response to determining that the terminal is transmitting data to the attack target server independent of the command of the user, determining that the recipient terminal is participating in the DDoS attack.

2. The method of claim 1, further comprising:

setting an amount of data that can be processed;

at the attack target server, determining whether an amount of data that needs to be processed exceeds the set amount of data; and in response to the amount of data that needs to be processed exceeding the set amount of data, determining that the attack target server suffers the DDoS attack.

3. The method of claim 1, wherein the information of the attack target server comprises information about the plurality of terminals and access information of the plurality of terminals.

4. The method of claim 1, further comprising:

registering the information of the attack target server with the control server, wherein informing the control server that the attack target server suffers the DDoS attack comprises sending an agreed command to the control server, and wherein the confirming and transmitting at the control server are performed in response to receiving the agreed command at the control server.

* * * * *